United States Patent [19]

Logman

[11] Patent Number: 4,778,152
[45] Date of Patent: Oct. 18, 1988

[54] PLUG VALVE HAVIG INTERCHANGEABLE PLUG MEMBER

[75] Inventor: Timothy M. Logman, Monticello, Ill.

[73] Assignee: Mueller Co., Decatur, Ill.

[21] Appl. No.: 51,344

[22] Filed: May 19, 1987

[51] Int. Cl.[4] ............................................. F16K 5/04
[52] U.S. Cl. .................................... 251/314; 251/310
[58] Field of Search ............... 251/304, 309, 310, 314, 251/317, 318

[56] References Cited

U.S. PATENT DOCUMENTS

| | | |
|---|---|---|
| 2,210,335 | 8/1940 | Mueller . |
| 2,222,626 | 11/1940 | Mueller et al. . |
| 2,285,221 | 6/1942 | Mueller . |
| 2,285,222 | 6/1942 | Mueller . |
| 2,571,925 | 10/1951 | Mueller et al. . |
| 3,349,799 | 10/1967 | Mueller et al. . |
| 3,350,057 | 10/1967 | Luckenbill . |
| 3,509,903 | 5/1970 | Lowe et al. . |
| 3,554,218 | 1/1971 | Smith . |
| 3,557,832 | 1/1971 | Mueller et al. . |
| 3,563,512 | 2/1971 | Hauffe . |
| 3,684,242 | 8/1972 | Hauffe et al. . |
| 3,799,500 | 7/1972 | Leopold, Jr. . |
| 3,802,661 | 4/1974 | Leopold, Jr. et al. . |
| 3,882,884 | 5/1975 | Leopold, Jr. et al. . |
| 3,991,975 | 11/1976 | Sibrava . |
| 4,291,859 | 9/1981 | Qasim et al. ............... 251/309 X |
| 4,410,003 | 10/1983 | Sandling .................... 251/317 X |
| 4,628,962 | 12/1986 | Pezzarossi ................. 251/314 X |

FOREIGN PATENT DOCUMENTS

| | | | |
|---|---|---|---|
| 0178052 | 4/1986 | European Pat. Off. ............ 251/310 |
| 2327 | of 1877 | Fed. Rep. of Germany ...... 251/317 |
| 2414018 | 1/1975 | Fed. Rep. of Germany ...... 251/310 |
| 2145219 | 11/1982 | Fed. Rep. of Germany ...... 251/304 |

OTHER PUBLICATIONS

Bulletin H-1, Meter Valves, May 1977, Mueller Co.

Primary Examiner—A. Michael Chambers
Assistant Examiner—John C. Fox
Attorney, Agent, or Firm—Cushman, Darby & Cushman

[57] ABSTRACT

A plug valve includes a body having an interior wall and fluid passages therethrough with the interior wall having raised ridge portions thereon located in a selected pattern for cooperation with a resilient sealing cover which is molded on a plug body so that when a selected plug body having the cover is inserted into the body the raised surfaces will engage and compress the resilient material to prevent fluid leakage therebetween; the plug member has a fluid passage which, upon rotation of the plug member in the body will be brought into and out of alignment with the fluid passages in the body; the body may have a plurality of fluid pathways which are selectable by selecting a plug member having a selected pathway for providing registry between a desired path of fluid travel.

24 Claims, 3 Drawing Sheets

PLUG VALVE HAVIG INTERCHANGEABLE PLUG MEMBER

BACKGROUND AND SUMMARY OF THE INVENTION

The present invention relates to an improved plug valve structure and, more specifically, a plug valve structure where an improved seal is provided between the plug member and the valve body so that easier operation of the plug member in the valve body will be achieved while significant cost savings in the manufacture of the value will also be effected.

In the past, a variety of sealing structures for the well-known rotary plug valves for water and gas distribution systems have been developed. In view of the fact that the sealing elements of these valves and the valve elements themselves are subjected to wide ranges of fluid pressures as well as grit and dust that are frequently carried in the fluids being handled, certain limitations on the valve sealing elements have been encountered in designing these types of valve members. In one type of arrangement, it has been the practice to form the plug member of the valve with grooves which extend peripherally about the plug member fluid passage opening. Sealing elements such as O-rings would then be placed in the grooves. Such arrangements often required, for many applications, the provision of special lubrication to maintain the integrity of the seal over the life of the valve body. In addition, the machining of the groove has often been a significant manufacturing difficulty as well as a limitation on the design of the valve plug itself in terms of the shape and orientation of the fluid passageway therethrough. In particular, the machining of an oval groove in the plug body about the periphery of an opening therethrough has been both time consuming and expensive in terms of the labor and equipment required to carefully machine such a groove.

In other arrangements, where a machined groove has been employed to house a sealing element, certain applications have required a specially designed seal to resist degradation of the sealing effect as a result of exposure to grit and dirt in certain environments. This has materially increased the manufacturing costs of such valves.

In another technique, it has been the practice to cover the valve plug member with a resilient cover such as of molded rubber or other suitable elastomer such as that sold under the trademark Neoprene. Alternately, the valve body chamber in which the plug was to be inserted, in some arrangements, has been coated with the resilient material. In either case, the sealing effect depended largely on the exact manufacturing tolerances as between the outer diameter of the plug member and the facing wall of the plug receiving chamber of the valve body. The maintenance of such close tolerances as were required to assure proper operation of the valve over its useful life materially increases the manufacturing costs on the one hand, and, on the other, with such valve structures, it was difficult to compensate for differential expansion as between the valve elements themselves and the resilient material covering that was employed. Further, operation of the valve could often be materially impeded by uneven wear on the resilient cover particularly where the fluid being handled carried any significant quantity of grit and dirt. In addition, where any pressure fluids were involved, in order to minimize the effect of cold flow of the rubber covering, a false port often had to be provided on the face of the plug member to absorb any bulge or distortion caused by a long term shut-off of the valve. In addition a false port is useful to prevent grit and dust from adhering to the seating surfaces which could result in damage to the seating surfaces upon rotation of the valve between its operating positions. A false port, in this case, is provided by forming a recess in the covering material and/or in the plug member itself to reduce seating contact and to thereby render turning of the plug member in the valve body easier.

In both of the foregoing alternatives, a plug member could only be provided with a single flow passage since it was essentially uneconomical to machine a separate flow passage in the valve body and provide alternate valve plug structures so that a user could accommodate alternate flow passages thus provided in the valve body.

The present invention provides a rotary plug valve structure which avoids the foregoing difficulties and provides a superior seal for a rotary plug valve which is less expensive to manufacture and yet which is capable of accommodating alternate plug valve bodies having different flow paths.

In one embodiment, the valve body which has a cylindrical internal plug receiving chamber is provided with a pattern of raised ridges only the inner surfaces of which need be machined to close tolerances. The alternate valve bodies may be used which have a different flow paths so that the plug member may be employed by the user with a selected valve body to suit the circumstances of a particular installation. The plug member itself is cylindrically shaped and, in one embodiment has a longitudinal axis and a fluid passage extending therethrough perpendicular to the longitudinal axis. The external surface of the plug member is provided with a resilient covering such as of rubber or other suitable resilient elastomer to an extent such that the cover will overlie the entire pattern of ridges provided on the interior wall of the valve body. The depth of the resilient cover is selected such that when a portion of the resilient cover engages a ridge of the valve body, the cover will be compressed sufficiently to effect the desired sealing to prevent fluid leakage between the cover and the contacting ridge.

With this structure, much less machining or grinding is required in manufacturing the valve body and plug than has heretofore been the case. In addition, deterioration of the resilient cover as a result of the presence of grit or dirt in the fluid being handled will be significantly reduced as a result of the reduced contact of the resilient cover over its surface with the raised ridges as well as the type of movement involved in opening and closing the valve passages.

The foregoing and other advantages will become apparent as consideration is given to the following detailed description taken in conjunction with the accompanying drawings, in which:

DETAILED DESCRIPTION OF THE INVENTION

Figure 1:
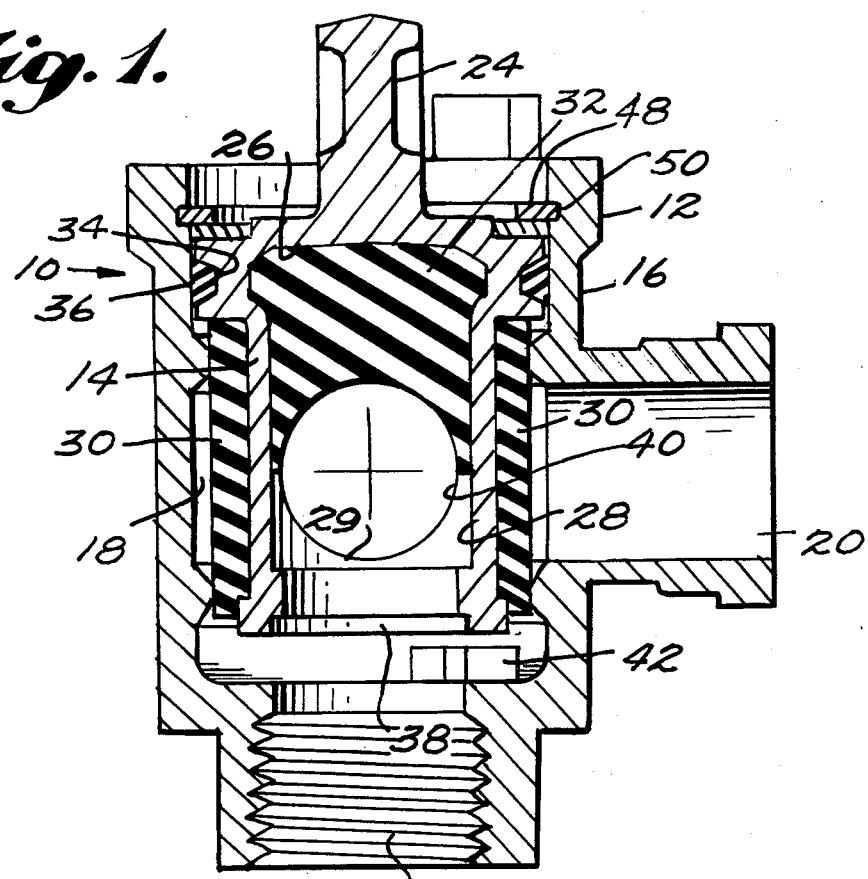
FIG. 1 is a sectional view in side elevation of the rotary plug valve of the present invention.
Figure 2:
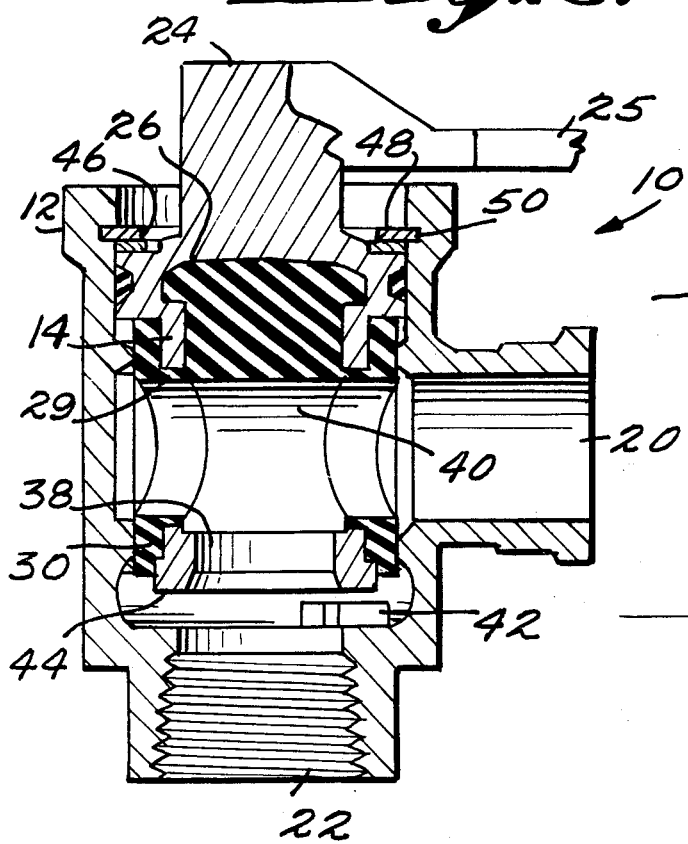
FIG. 2 is a view similar to FIG. 1 but showing the valve in an open condition.

Referring now to the drawings wherein like numerals designate corresponding parts through out the several views, there are shown in FIGS. 1 and 2, the valve 10 of the present invention. The valve 10 includes a valve body 12 which may be cast from a suitable metallic alloy or iron or brass or molded from plastic such polypropylene, the selection being being largely dependent on the environment in which the valve will be placed. As shown, the valve body is generally cylindrical in shape having a circumferential side wall 16 and an interior cylindrical wall 18 which defines a plug receiving chamber for receiving the generally cylindrical plug member 14. The body 12 is formed with a lateral inlet/outlet passage 20 and an axial inlet/outlet passage 22 which is internally threaded, as shown. Other connection methods such as external threads maybe used, of course.

The plug member 14 has a key member 24 having a locking tongue 25 (FIG. 2) formed on the upper portion thereof. The plug member 14 is formed with a hollow core 26 which may be partially filled with a resilient material 32 such as rubber or a synthetic elastomer. The hollow core 26 lies within a cylindrical wall 28 which is provided with aligned openings 29 for defining a through passage 40 which extends generally perpendicular to the longitudinal axis of the plug member 14. The cylindrical wall 28 is covered with a resilient material 30. In the manufacture of the plug member 14, the resilient cover 30 and the filler 32 may be integrally molded on the plug member 14 by conventional molding techniques. In one such process, the depth of the resilient cover 30 will be defined by a mold cavity and in the molding process, the hollow core 26 will be entirely filled. Core pins, 41 (FIG. 7) may be used during molding to form the passages 40 and 22 and 38. Alternately, a suitable machining of the passage 40 may be done such as by a drill or cutting punch. Other suitable techniques for providing the resilient cover 30 and filler 32 will be apparent to those skilled in this art. Preferably, the resilient cover is rubber although other synthetic resilient elastomers may be employed, if desired. The upper portion of the cylindrical wall 28 terminates adjacent a circumferential groove 34 which is provided for retaining an O-ring 36, as shown. Of course, complimentary shaped sealing rings may also be employed as will be apparent to those skilled in this art.

The end of the plug member 14 opposite the key 24 is opened to provide an inlet/outlet passage 38 which will be, in the illustrated embodiment, in communication with the inlet/outlet passage 22 of the valve body 12.

As shown in FIG. 1, the plug member 14 is in the closed position while in FIG. 2, the plug member 14 is in the open position whereby a fluid path through the valve 10 is established between passages 22, 38, 40 and 20.

By virtue of the improved sealing means provided by the present invention, the relative dimensions of the plug number 14 and the chamber defined by the interior wall 18 of the body 12 will be such that the plug member can be easily inserted axially into the body 12 to the position illustrated in FIGS. 1 and 2. A washer 46 may be provided on the external top portion of the plug member 14 about the key 24 and a snap ring 48 may be employed in combination with a retaining groove 50 to retain the plug member in its installed position. As will be evident to those skilled in this art, other means for retaining the plug 14 within the body 12 may be employed, if desired.

Figure 3:
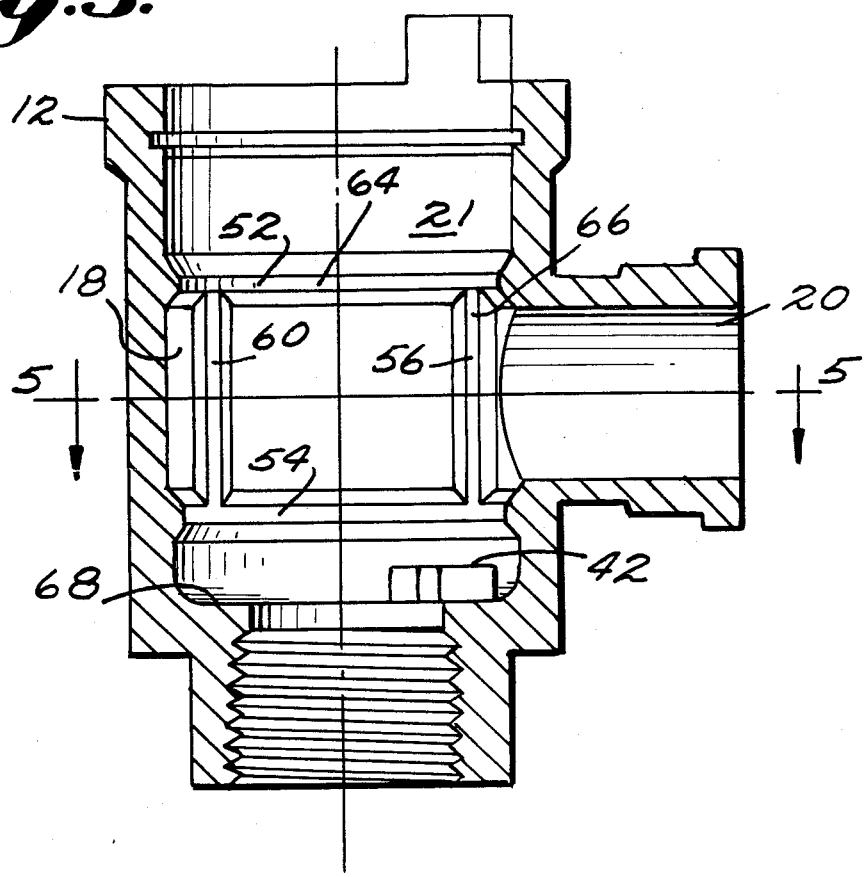
FIG. 3 is a view similar to FIG. 1 but with the plug member removed.
Figure 5:
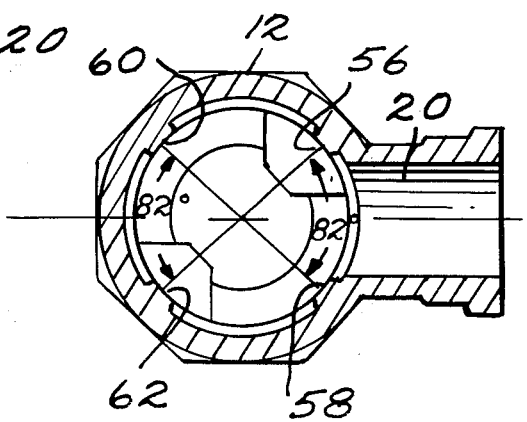
FIG. 5 is a view along lines 5—5 of FIG. 3.

With reference now to FIG. 3, there is shown the plug receiving chamber 21 defined by the interior wall 18 of the plug valve body 12. As formed, raised surface means in the form of a plurality of ridges are provided in a selected pattern on the interior wall 18 to effect a fluid tight seal in cooperation with the resilient cover 30 of the plug member 14. Specifically, a first ridge 52 is formed about the periphery of the wall 18 above the passage 20 and a second identically shaped ridge 54 is provided below the outlet 20 about the entire circumference of the wall 18. By providing the ridges 52 and 54 about the entire internal circumference of the wall 18, fluid tight sealing will be achieved for any rotational position of the plug member 14. Indeed, in most applications, the sealing with respect to ridge 52 and the resilient cover 30 will be sufficient so that the O-ring 36 may be eliminated. In certain high pressure applications, however, it may be desirable to employ the O-ring 36 as a safety backup. Referring now to FIGS. 3 and 5, a pair of parallel extending third and fourth ridges, 56 and 58 respectively extend between the first and second ridges and are located on opposite sides of the passage 20 as clearly illustrated in FIG. 5. The third and fourth ridges extend parallel to the longitudinal axis of the body 12. A fifth and sixth pair of ridges 60 and 62 (FIG. 5) are located in mirror image to the third and fourth ridges 56 and 58. In such an arrangement, balanced rotation of the plug member 14 can be more easily effected. In addition, in the manufacture of the plug body 12, an end user may simply install a plug in the passage 22 and open a passage in axial alignment to passage 20 by drilling an opening between ridges 60 and 62 in the plug body 12.

As previously noted, the body 12 may be formed by conventional metal casting. With such an arrangement, the innermost flat surfaces 64 of each of the ridges should be ground or machined smooth by conventional deburring techniques. In addition, the points of intersection as at 66 between the first and second ridges and the four ridges which extend parallel to the longitudinal axis of the body 12 should also be ground smooth so that these intersections will be uninterrupted. The remainder of the interior of the body 12 need not be machined or ground and may be left rough thus resulting in significant savings in the manufacture of this valve body.

Figure 4:
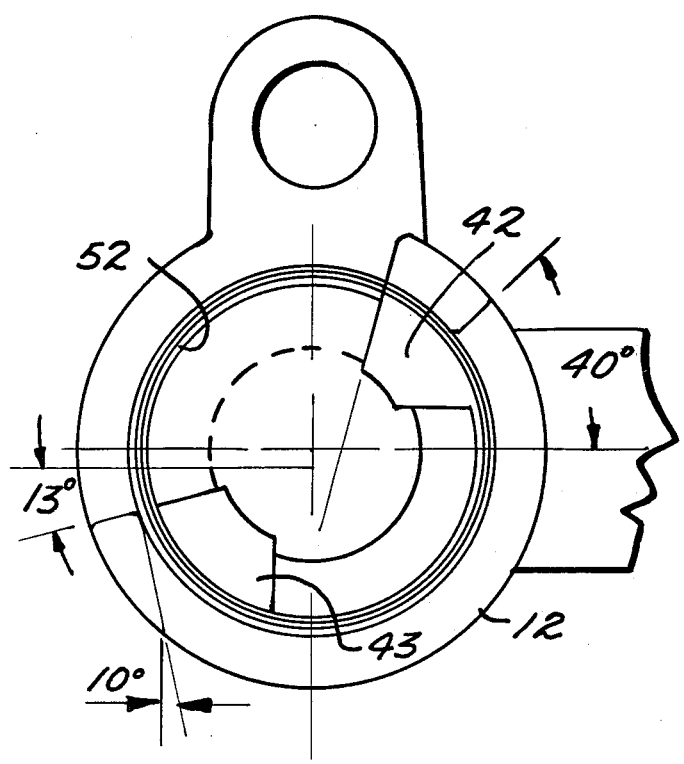
FIG. 4 is a top plan view of the valve body of FIG. 3.

As shown in FIGS. 3 and 4, the chamber 21 has an internal flange 68 on which is formed a pair of blocks 42 and 43 which are diametrically disposed relative to the longitudinal axis of the body 12 and which protrude radially inwardly as shown in FIG. 4. The blocks 42 and 43 serve to stop tubing from entering when threaded in passages 22. With this arrangement, accurate alignment of the opening 40 in the plug member 14 relative to the passage 20 will be assured.

Figure 6:
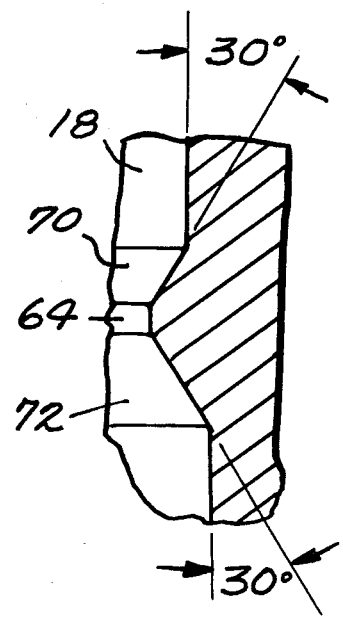
FIG. 6 is an enlarged detailed view of a sealing ridge on the internal wall of the valve body.

To assure smooth rotation of the plug member 14, particularly regarding relative movement between the resilient cover 30 and the third through sixth ridges, the side walls of the ridges as illustrated in FIG. 6 are sloped relative to the wall 18 with the angle of slope being between 20 and 45 degrees. Preferably, the angle of sloped is approximately 30 degrees. With the slope side walls 70 and 72 provided for each of the ridges, the resilient cover will be gradually compressed from its free molded diameter to the compressed state defined by the inside diameter of the metal ridges with the gradual transition from the uncompressed to the compressed condition minimizing wear or damage to the resilient cover 30.

Figure 7:
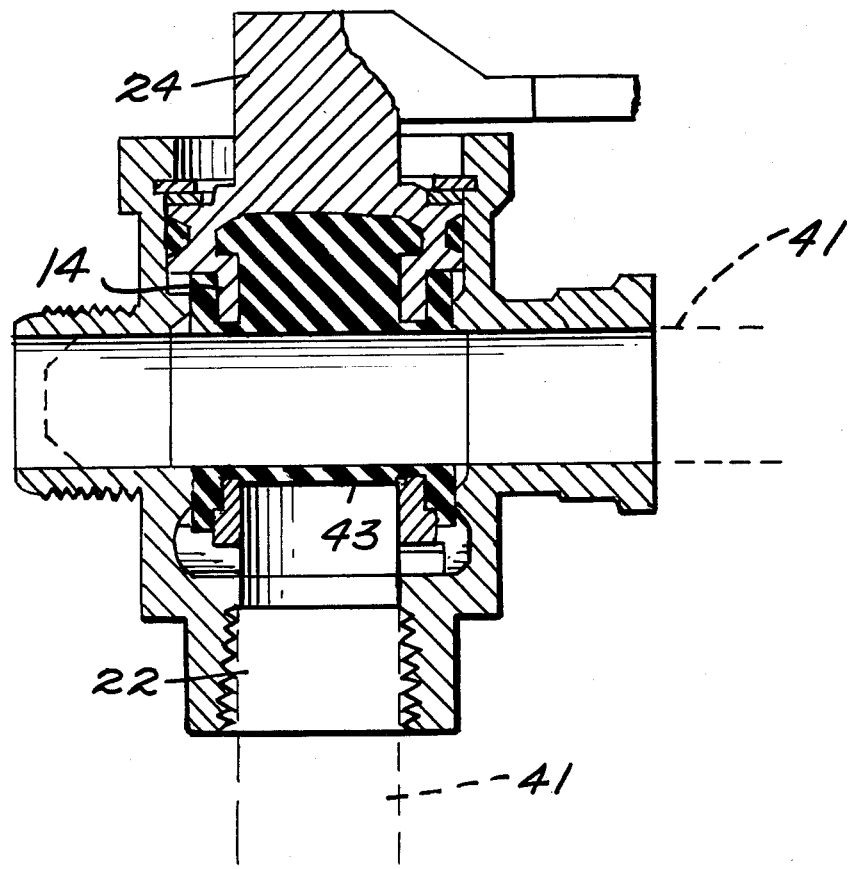
FIG. 7 is a view similar to FIG. 5 but showing another embodiment.

As shown in FIG. 7, the body 12 may be formed with a tranverse opening 39 and associated connection. After molding, the piece 43 is discarded and when opening 39 is to be used, a plug is installed in 22.

From the foregoing, it will be apparent that a high integrity fluid seal will be achieved with the structure of the plug valve of the present invention and one which is characterized by high durability due to the relationship of the resilient cover and the sealing ridges.

Having described the invention, it will apparent to those skilled in the art that various modifications may be made thereto without departing from the spirit and scope of this invention as defined in the appended claims.

What the claim is:

1. A rotary plug valve having a body including a wall defining a plug receiving chamber, a plug member including fluid passage therethrough and having a peripheral side wall portion having a selected diameter, said side wall portion having at least a resilient material to a selected depth, said wall of said body having openings therein disposed so that when said plug member is rotatably located in said chamber, said fluid passage will be alignable in flow communication with at least some of said openings, said wall further including raised metallic surface formed thereon extending from said wall into said chamber to a selected distance and located in a selected pattern relative to said openings so that, when said plug member is rotatably disposed in said plug receiving chamber, said metallic surface means will locally deform said resilient material and thereby sealingly engage sections of said resilient material of said plug member to substantially prevent leakage of fluid therebetween.

2. The invention as claimed in claim 1, wherein said plug member is substantially cylindrical in shape and has a longitudinal axis, along which said plug member wall extends, said fluid passage comprising a bore extending through said plug member substantially perpendicularly to said longitudinal axis.

3. The invention as claimed in claim 2, wherein said plug member further has end portions between which said side wall portions extend and includes a further fluid passage extending through one of said end portions and communicating with said bore.

4. The invention as claimed in claim 1, wherein said body has opposite ends which are open, one of which is of diameter sufficient to receive said plug member.

5. The invention as claimed in claim 1, wherein said body has opposite ends and one of said openings in said wall is located intermediate said opposite ends of said body, said plug member having a substantially cylindrical shape and having a longitudinal axis, said plug member further having end portions between which said side wall extends, said fluid passage comprising a bore extending through said plug member substantially perpendicularly to said longitudnal axis, said selected pattern of said raised surface means including a first circumferential ridge disposed on said wall on one side of said one opening and a second circumferential ridge disposed on said wall on the opposite side of said one opening.

6. The invention as claimed in claim 5, wherein said raised surface means further includes a third ridge extending between said first and second ridges and located on another side of said one opening and a fourth ridge extending between said first and second ridges and disposed on a side of said one opening opposite to said another side.

7. The invention as claimed in claim 6, wherein said raised surface means further includes fifth and sixth ridges both extending between said first and second ridges, said third, fourth, fifth and sixth ridges being spaced from one another about said wall of said body.

8. The invention as claimed in claim 7, wherein each of said third, fourth , fifth and sixth ridges have opposite ends which intersect, respectively, and first and second ridges.

9. The invention as claimed in claim 8, wherein the intersection of each of said ridges is a smooth and uninterrupted surface portion.

10. The invention as claimed in claim 6, wherein each said ridge is formed with side surfaces which slope outwardly from said wall of said body.

11. The invention as claimed in claim 10, wherein said side surfaces slope at an angle of between 20 and 45 degrees with respect to said wall of side body.

12. The invention as claimed in claim 11, wherein said angle of slope is approximately 30 degrees.

13. The invention as claimed in claim 5, wherein each said ridge is formed with side surface which slope outwardly from said wall of said body.

14. The invention as claimed in claim 13, wherein said side surfaces slope at an angle of between 20 and 45 degrees with respect to said wall of said body.

15. The invention as claimed in claim 14, wherein said angle of slope is approximately 30 degrees.

16. The invention as claimed in claim 5, wherein said ridges have inner surfaces which are ground smooth.

17. The invention as claimed in claim 1, wherein said resilient material is rubber.

18. The invention as claimed in claim 1, wherein said resilient material is molded on said side wall portion.

19. The invention as claimed in claim 1, wherein said body is cast metal and said raised surface means have inner surfaces which are formed smooth.

20. The invention as claimed in claim 1, wherein said selected depth of said resilient material on said side wall of said plug member and said selected distance to which said raised surface means extend from said wall of said body are such that said raised surface means compress said resilient material in the area of mutual engagement thereof.

21. The invention as claimed in claim 1, wherein said plug member has a hollow core which is at least partially filled with said resilient material.

22. The invention as claimed in claim 21, wherein said resilient material is molded rubber.

23. The invention as claimed in claim 1, wherein said plug member has opposite ends, one of said ends having an external groove formed circumferentially thereabout for receiving a sealing ring member.

24. The invention as claimed in claim 1, wherein said plug member has opposite ends, one of said ends carrying external key means.

* * * * *